(12) United States Patent
Abe et al.

(10) Patent No.: US 10,590,242 B2
(45) Date of Patent: Mar. 17, 2020

(54) METHOD FOR PRODUCING HYDROSILYL GROUP-CONTAINING ORGANIC SILICON RESIN

(71) Applicant: SHIN-ETSU CHEMICAL CO., LTD., Tokyo (JP)

(72) Inventors: Takuya Abe, Annaka (JP); Hiroomi Iyoku, Annaka (JP); Masanao Kamei, Annaka (JP); Yoshinori Takamatsu, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 74 days.

(21) Appl. No.: 15/767,337

(22) PCT Filed: Sep. 14, 2016

(86) PCT No.: PCT/JP2016/004169
§ 371 (c)(1),
(2) Date: Apr. 10, 2018

(87) PCT Pub. No.: WO2017/064831
PCT Pub. Date: Apr. 20, 2017

(65) Prior Publication Data
US 2018/0298148 A1    Oct. 18, 2018

(51) Int. Cl.
| | | |
|---|---|---|
| *C08G 77/12* | (2006.01) |
| *C08G 77/06* | (2006.01) |
| *C08G 77/08* | (2006.01) |
| *C08G 77/10* | (2006.01) |

(52) U.S. Cl.
CPC .............. *C08G 77/12* (2013.01); *C08G 77/06* (2013.01); *C08G 77/08* (2013.01); *C08G 77/10* (2013.01)

(58) Field of Classification Search
CPC ................................................... C08G 77/12
See application file for complete search history.

(56) References Cited

U.S. PATENT DOCUMENTS

| | | | | |
|---|---|---|---|---|
| 4,774,310 A  * | 9/1988 | Butler .................... | C08G 77/12 |
| | | | 528/12 |
| 5,527,873 A | 6/1996 | Kobayashi et al. | |
| 2003/0176614 A1 | 9/2003 | Hacker et al. | |
| 2006/0081864 A1 | 4/2006 | Nakazawa | |
| 2007/0249790 A1 | 10/2007 | Kashiwagi et al. | |
| 2008/0318067 A1 * | 12/2008 | Itoh ........................... | C08J 5/18 |
| | | | 428/447 |
| 2013/0197254 A1 | 8/2013 | Li et al. | |
| 2013/0289293 A1 | 10/2013 | Bekemeier et al. | |
| 2014/0213809 A1 * | 7/2014 | Kusunoki ............... | C07F 7/188 |
| | | | 556/451 |

FOREIGN PATENT DOCUMENTS

| | | | |
|---|---|---|---|
| CA | 2133166 C | * | 9/1998 |
| CN | 1261384 A | | 7/2000 |
| CN | 101295032 A | | 10/2008 |
| EP | 1010714 A1 | | 6/2000 |
| JP | S63-8421 A | | 1/1988 |
| JP | H07-188415 A | | 7/1995 |
| JP | H07-228701 A | | 8/1995 |
| JP | H08-319351 A | | 12/1996 |
| JP | 2011-184509 A | | 9/2011 |
| JP | 2013-541623 A | | 11/2013 |
| JP | 2014-517101 A | | 7/2014 |
| JP | 2014-185263 A | | 10/2014 |

OTHER PUBLICATIONS

Dec. 20, 2016 International Search Report issued in International Patent Application No. PCT/JP2016/004169.
Apr. 5, 2019 Extended European Search Report issued in European Patent Application No. 16855088.7.

* cited by examiner

*Primary Examiner* — Marc S Zimmer
(74) *Attorney, Agent, or Firm* — Oliff PLC

(57) ABSTRACT

A method for producing a hydrosilyl group-containing organic silicon resin of formula (6) in a solid form, wherein after formulae (1) to (3) are hydrolyzed in the presence of an acid catalyst, hydrolysis is carried out by adding hydrosilyl group-containing organic silicon compounds of formulae (4) and (5), followed by neutralization by a base catalyst with the amount thereof being more than a molar equivalent of the acid catalyst, and then by condensation. By so doing, deactivation amount of the hydrosilyl group can be reduced, so that the method for producing the hydrosilyl group-containing organic silicon resin, which is in a solid form without a solvent and to which a hydrosilyl group can be introduced quantitatively and in a large quantity, is provided, $$R^1_3SiOSiR^1_3 \tag{1}$$

$$R^1_3SiX^1 \tag{2}$$

$$SiX^2_4 \tag{3}$$

$$H_nR^2_{3-n}SiOSiR^2_{3-n}H_n \tag{4}$$

$$H_nR^2_{3-n}SiX^3 \tag{5}$$

$$(R^1_3SiO_{1/2})_a(H_nR^2_{3-n}SiO_{1/2})_b(SiO_2)_c(R^4SiO_{3/2})_d \tag{6}$$

17 Claims, No Drawings

METHOD FOR PRODUCING HYDROSILYL GROUP-CONTAINING ORGANIC SILICON RESIN

TECHNICAL FIELD

The present invention relates to a method for producing a hydrosilyl group-containing organic silicon resin having an industrially high use value.

BACKGROUND ART

An organic silicon resin is a three-dimensional structural body having silicon of a Q-unit ($SiO_{4/2}$) and a T-unit ($RSiO_{3/2}$) (R represents, for example, a monovalent organic group) as essential components. An organic silicon resin having a strong skeleton shows characteristics such as weather resistance, heat resistance, water repellency, and electric insulation, so that it is used in a pressure-sensitive adhesive, a rubber compound, a releasing agent, a coating material, etc. In recent years, demands as raw materials of cosmetics such as foundation, eye-shadow, cream, milky lotion, and hair cosmetic are also increasing because part of the organic silicon resins has a film forming property.

Further, when the organic silicon resin is modified with an organic functional group, new characteristics other than the characteristics can be added. For example, when the resin is modified by a hydrophilic group such as polyether, it can be provided with hydrophilicity. Because general organic silicon resins use organosilanes and disiloxanes such as $(CH_3)_3SiCl$, $(CH_3)_3SiOSi(CH_3)_3$, and $(CH_3)_3SiOH$ as the source of an M-unit ($R_3SiO_{1/2}$), the surface thereof is covered with a trimethylsilyl group, so that they are very hydrophobic. Therefore, when it is provided with a hydrophilic group, a resin having a water retaining property can be synthesized (Patent Document 1). Also, when it is modified with a reactive functional group such as an epoxy group, the resin can be used as a thermosetting resin for an optical semiconductor such as LED (Patent Document 2 and Patent Document 3). Further, when it is modified with a short chain alkyl group, the resin can be applied as a resin additive in a pigment-containing cosmetic blend (Patent Document 4).

As the method for introducing an organic functional group to the organic silicon resin, (1) a post-grafting method (grafting method) and (2) a co-condensation method may be mentioned. In the method (1), for example, by silylating a surface silanol group of an organic silicon resin with a chlorosilane such as $R_3SiCl$, an organic group can be introduced into it. However, because complete control of amount of the silanol group on the organic silicon resin surface is difficult, there is a problem that accurate control of the amount of the modifying organic group is difficult. Besides, because a strong acid is generated at the time of silylation reaction, there is a possibility that bonds of the organic silicon resin are broken. In the method (2), for example, by co-condensation of two alkoxysilanes with the Q-unit ($SiO_{4/2}$) and with the T-unit ($RSiO_{3/2}$) (part of R is an organic functional group), an organic functional group can be introduced by one-pot. However, because hydrolysis properties of these two alkoxysilanes are different, it has been difficult to obtain the organic silicon resin having the Q-unit and T-unit uniformly dispersed.

On the other hand, as to the active point of the organic silicon resin having a reaction active point usable in the grafting method (1), besides the silanol group, a vinyl group may be mentioned. To the organic silicon resin having a vinyl group, an organic group can be introduced by a hydrosilylation reaction with a hydrosilyl group-containing organic compound or a thiolene reaction with an organic group having a thiol group. However, organic compounds having a hydrosilyl group or a thiol group are not so many that the introducible organic groups are limited. Alternatively, a hydrosilyl group may also be considered as the reaction active point. To the hydrosilyl group-containing organic silicon resin, an organic group can be introduced by a hydrosilylation reaction with an organic compound having a vinyl group or an allyl group. Because there are many organic compounds having a vinyl group or an allyl group, by using this method, organic silicon resins having various organic groups can be obtained.

As to the method for producing the hydrosilyl group-containing organic silicon resin, there is a method in which a chlorosilanes such as dimethyl chlorosilane or methyl dichlorosilane is caused to react with the silanol group on surface of the organic silicon resin. However, chlorosilanes have so high reactivity that they are prone to undergo hydrolysis condensation by themselves; and thus, there is a problem that the hydrosilyl group cannot be quantitatively introduced to the resin. Alternatively, a method is proposed that diorganopolysiloxane or tetraorganodisiloxane, both having the hydrosilyl group, is added to the synthesized organic silicon resin followed by a re-equilibration reaction so as to introduce the hydrosilyl group (Patent Document 5). However, with this method, the introducible amount of the hydrosilyl group is so small; and thus, it is considered that introduction of a large amount thereof is difficult.

Further, by co-hydrolysis condensation reaction of a chlorosilane having the hydrosilyl group (Patent Document 6 and Patent Document 7), or of a hydrogenated halosilane (Patent Document 8), the hydrosilyl group-containing organic silicon resin can also be produced; in these methods, however, there are problems such as lowering of the molecular weight and a low hydrogen content. Alternatively, a method in which a hydrosilicone oil is added to the hydroxyl group-containing organic silicon resin by way of a dehydrogenation reaction is proposed; however, the form of the organic silicon resin obtained by modification with a flexible silicone is limited to a liquid (Patent Document 9).

CITATION LIST

Patent Documents

Patent Document 1: Japanese Patent Laid-Open Publication No. H08-319351
Patent Document 2: Japanese Patent Laid-Open Publication No. 2014-185263
Patent Document 3: Japanese Patent Laid-Open Publication No. 2011-184509
Patent Document 4: Japanese Patent Application Publication No. 2014-517101
Patent Document 5: Japanese Patent Laid-Open Publication No. H07-228701
Patent Document 6: Specification of U.S. Patent Application Publication No. 20060081864
Patent Document 7: Specification of Chinese Patent Application Publication No. 101295032
Patent Document 8: Specification of Chinese Patent Application Publication No. 1261384
Patent Document 9: Japanese Patent Application Publication No. 2013-541623

SUMMARY OF INVENTION

Technical Problem

As mentioned above, in the hydrosilyl group-containing organic silicon resin that can be an important raw material of organic silicon resins having various organic groups, a method for producing a hydrosilyl group-containing organic silicon resin, in which the hydrosilyl group thereof can be arbitrarily set and amount of the hydrosilyl group that is deactivated during the process is decreased, is being wanted.

The present invention is made in view of the above situation, and thus, has an object to provide a method for producing a hydrosilyl group-containing organic silicon resin which is in a solid form without a solvent and into which the hydrosilyl group can be introduced quantitatively and in a large quantity by reducing a deactivation amount of the hydrosilyl group.

Solution to Problem

In order to solve the problem mentioned above, the present invention provides a method for producing a hydrosilyl group-containing organic silicon resin, wherein after a mixture of one, or two or more of organic silicon compounds represented by following general formulae (1) and (2) with any one or more of a hydrolysable silane represented by following general formula (3), a partial hydrolysis condensate of the hydrolysable silane, and a metal salt of the hydrolysable silane is hydrolyzed in a presence of an acid catalyst, to a hydrolyzate thereby obtained, one, or two or more of hydrosilyl group-containing organic silicon compounds represented by following general formulae (4) and (5) is added, which is then followed by re-hydrolysis, and thereafter, neutralization is done by adding a base catalyst with an amount of more than a molar equivalent of the acid catalyst, which is followed by condensation to obtain a hydrosilyl group-containing organic silicon resin represented by following average composition formula (6), which contains a Q-unit ($SiO_2$) and an M-unit (($R^1_3SiO_{1/2}$) and ($H_nR^2_{3-n}SiO_{1/2}$)) as essential components, and which is in a solid form without a solvent,

$$R^1_3SiOSiR^1_3 \quad (1)$$

$$R^1_3SiX^1 \quad (2)$$

wherein $R^1$ may be the same or different with each other, representing an unsubstituted or substituted monovalent hydrocarbon group; and $X^1$ represents a hydrolysable functional group, $$SiX^2_4 \quad (3)$$

wherein $X^2$ represents a hydrolysable functional group,

$$H_nR^2_{3-n}SiOSiR^2_{3-n}H_n \quad (4)$$

$$H_nR^2_{3-n}SiX^3 \quad (5)$$

wherein $R^2$ may be the same or different with each other, representing an unsubstituted or substituted monovalent hydrocarbon group; $X^3$ represents a hydrolysable functional group; and $1 \le n \le 3$, and

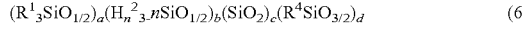
$$(R^1_3SiO_{1/2})_a(H_n{}^2_{3-n}SiO_{1/2})_b(SiO_2)_c(R^4SiO_{3/2})_d \quad (6)$$

wherein $R^1$, $R^2$ and n represents the same as before; $R^4$ represents an unsubstituted or substituted monovalent hydrocarbon group; and $0 < a \le 1.5$, $0.2 \le b \le 1.5$, $0 < c \le 1$, $0 \le d \le 1.5$, and $0.5 \le a+b/c \le 1.0$.

In the method for producing the hydrosilyl group-containing organic silicon resin of the present invention, after a mixture of one, or two or more of organic silicon compounds represented by the general formulae (1) and (2) with any one or more of a hydrolysable silane represented by the general formula (3), a partial hydrolysis condensate of the hydrolysable silane, and a metal salt of the hydrolysable silane is hydrolyzed in the presence of an acid catalyst, to a hydrolyzate thereby obtained, one, or two or more of hydrosilyl group-containing organic silicon compounds represented by the general formulae (4) and (5) is added, which is followed by re-hydrolysis. By so doing, deactivation of the hydrosilyl group during the hydrolysis can be reduced; and as a result, the hydrosilyl group can be introduced quantitatively and in a large quantity. In addition, though the neutralization is carried out by addition of the base catalyst with the amount of more than an equivalent of the acid catalyst, deactivation of the hydrosilyl group hardly takes place; on the contrary, condensation reaction of the organic silicon resin takes place preferentially, thereby leading to increase in the molecular weight thereof, so that the hydrosilyl group-containing organic silicon resin which is in a solid form without a solvent can be obtained.

According to the method for producing the hydrosilyl group-containing organic silicon resin of the present invention, in a $^{29}$Si—NMR analysis of the produced hydrosilyl group-containing organic silicon resin, an integral value of the peak between −10 and −20 ppm can be made 1.0% or less, even 0.1% or less, relative to total integral value of the entire silicon.

Therefore, in the hydrosilyl group-containing organic silicon resin produced by the method for producing the hydrosilyl group-containing organic silicon resin of the present invention, the integral value of the peak due to a D-unit formed by the reaction to deactivate the hydrosilyl group in the $^{29}$Si—NMR analysis can be suppressed to 1.0% or less, even to 0.1% or less, relative to total integral value of the entire silicon.

In the method for producing the hydrosilyl group-containing organic silicon resin of the present invention, it is preferable to carry out the method in such a way that after the mixture of one, or two or more of the organic silicon compounds represented by the general formulae (1) and (2) with any one or more of the hydrolysable silane represented by the general formula (3), the partial hydrolysis condensate of the hydrolysable silane, and the metal salt of the hydrolysable silane is hydrolyzed in the presence of the acid catalyst, the hydrolyzate is cooled down to 25° C.; and then, after the hydrosilyl group-containing organic silicon compound is added, re-hydrolysis is carried out at a temperature below a boiling point of the used hydrosilyl group-containing organic silicon compound.

Production of the hydrosilyl group-containing organic silicon resin within the temperature range mentioned above is preferable because deactivation of the hydrosilyl group can be further suppressed.

In the method for producing the hydrosilyl group-containing organic silicon resin of the present invention, in neutralization by using the base catalyst, it is preferable to concurrently use sodium hydroxide as a strong base catalyst and calcium carbonate as a weak base catalyst.

Therefore, when a combination of sodium hydroxide and calcium carbonate is used as the base catalyst, the molecular weight sufficiently increases, so that the organic silicon resin in a solid form can be obtained more surely.

In the method for producing the hydrosilyl group-containing organic silicon resin of the present invention, when one, or a mixture of two or more of organic silicon compounds represented by following general formula (7) is further added before hydrolysis of the mixture of one, or two or more of organic silicon compounds represented by the general formulae (1) and (2) with any one or more of a hydrolysable silane represented by the general formula (3), a partial hydrolysis condensate of the hydrolysable silane, and a metal salt of the hydrolysable silane, or after this hydrolysis and before re-hydrolysis, a hydrosilyl group-containing organic silicon resin, which is a powder form without a solvent and represented by the average composition formula (6) wherein d is $0<d\leq1.5$, can be obtained,

$(R^3O)_3SiR^4$ (7)

wherein $R^4$ represents the same as before; and $R^3$ may be the same or different with each other, representing an unsubstituted or substituted monovalent hydrocarbon group.

When one, or a mixture of two or more of organic silicon compound represented by the general formula (7) is further added, the produced hydrosilyl group-containing organic silicon resin can be made to include the T-unit ($R^4SiO_{3/2}$).

Advantageous Effects of Invention

According to the method for producing the hydrosilyl group-containing organic silicon resin of the present invention, deactivation of the hydrosilyl group during hydrolysis can be reduced; and as a result, the hydrosilyl group can be introduced quantitatively and in a large quantity. In addition, because neutralization is carried out by using the base catalyst with, the amount more than equivalent of the acid catalyst, condensation reaction of the organic silicon resin takes place preferentially, so that the molecular weight thereof can be increased and the hydrosilyl group-containing organic silicon resin which is in a solid form (for example, powder form) without a solvent can be obtained. Especially, when as the base catalyst, sodium hydroxide is used as a strong base catalyst concurrently with calcium carbonate as a weak base catalyst, the hydrosilyl group-containing organic silicon resin which is in a solid form can be obtained more surely. In addition, in the present invention, by changing a charging amount of the hydrosilyl group-containing organic silicon compound, amount of the hydrosilyl group included in the organic silicon resin can be quantitatively changed.

DESCRIPTION OF EMBODIMENTS

Inventors of the present invention carried out an extensive investigation in order to achieve the object mentioned above; and as a result, it was found that when after hydrolysis of a mixture of an organic silicon compound represented by the general formula (1) and/or the general formula (2) with a hydrolysable silane represented by the general formula (3), a partial hydrolysis condensate of the hydrolysable silane, or a metal salt of the hydrolysable silane, a hydrosilyl-containing organic silicon compound represented by the general formula (4) and/or the general formula (5) is added to a hydrolyzate to carry out re-hydrolysis, deactivation of the hydrosilyl group during hydrolysis can be reduced. In addition, surprisingly, though neutralization is carried out using a base catalyst with the amount more than equivalent of the acid catalyst, deactivation of the hydrosilyl group hardly takes place; but contrary, the condensation reaction of the organic silicon resin takes place preferentially, thereby leading to increase in the molecular weight thereof; and as a result, it was found that the hydrosilyl group-containing organic silicon resin which is in a solid form without a solvent can be obtained. On the basis of this finding, the present invention could be achieved.

Namely, the present invention relates to a method for producing a hydrosilyl group-containing organic silicon resin, wherein after a mixture of one, or two or more of organic silicon compounds represented by following general formulae (1) and (2) with any one or more of a hydrolysable silane represented by following general formula (3), a partial hydrolysis condensate of the hydrolysable silane, and a metal salt of the hydrolysable silane is hydrolyzed in a presence of an acid catalyst, to a hydrolyzate thereby obtained, one, or two or more of hydrosilyl group-containing organic silicon compounds represented by following general formulae (4) and (5) is added, which is then followed by re-hydrolysis, and thereafter, neutralization is done by adding a base catalyst with an amount of more than a molar equivalent of the acid catalyst, which is followed by condensation to obtain a hydrosilyl group-containing organic silicon resin represented by following average composition formula (6), which contains a Q-unit ($SiO_2$) and an M-unit (($R^1_3SiO_{1/2}$) and ($H_nR^2_{3-n}SiO_{1/2}$)) as essential components, and which is in a solid form without a solvent,

$R^1_3SiOSiR^1_3$ (1)

$R^1_3SiX^1$ (2)

wherein $R^1$ may be the same or different with each other, representing an unsubstituted or substituted monovalent hydrocarbon group; and $X^1$ represents a hydrolysable functional group, $SiX^2_4$ (3)

wherein $X^2$ represents a hydrolysable functional group,

$H_nR^2_{3-n}SiOSiR^2_{3-n}H_n$ (4)

$H_nR^2_{3-n}SiX^3$ (5)

wherein $R^2$ may be the same or different with each other, representing an unsubstituted or substituted monovalent hydrocarbon group; $X^3$ represents a hydrolysable functional group; and $1\leq n\leq3$, and

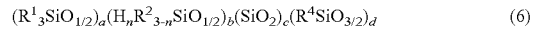

$(R^1_3SiO_{1/2})_a(H_nR^2_{3-n}SiO_{1/2})_b(SiO_2)_c(R^4SiO_{3/2})_d$ (6)

wherein $R^1$, $R^2$ and n represents the same as before; $R^4$ represents an unsubstituted or substituted monovalent hydrocarbon group; and $0<a\leq1.5$, $0.2\leq b\leq1.5$, $0<c\leq1.0$, $0\leq d\leq1.5$, and $0.5\leq a+b/c\leq1.0$.

In the general formulae (1), (2), and (6), $R^1$ may be the same or different with each other, representing an unsubstituted or substituted monovalent hydrocarbon group, preferably an unsubstituted or substituted monovalent hydrocarbon group having 1 to 10 carbon atoms, including saturated aliphatic hydrocarbon groups such as a methyl group, an ethyl group, a propyl group, a butyl group, and a pentyl group; saturated alicyclic hydrocarbon groups such as a cyclopentyl group and a cyclohexyl group; aromatic hydrocarbon groups such as a phenyl group and a tollyl group; and halogenated hydrocarbon groups such as a trifluoropropyl group, a heptadecafluorodecyl group, a chloropropyl group, and a chlorophenyl group, wherein a saturated hydrocarbon group having 1 to 5 carbon atoms, a phenyl group, or a trifluoropropyl group is especially preferable.

In the general formulae (4), (5), and (6), $R^2$ may be the same or different with each other, representing an unsubstituted or substituted monovalent hydrocarbon group, preferably an unsubstituted or substituted monovalent hydrocarbon group having 1 to 10 carbon atoms, including saturated aliphatic hydrocarbon groups such as a methyl group, an ethyl group, a propyl group, a butyl group, and a pentyl group; saturated alicyclic hydrocarbon groups such as a cyclopentyl group and a cyclohexyl group; aromatic hydrocarbon groups such as a phenyl group and a tollyl group; and halogenated hydrocarbon groups such as a trifluoropropyl group, a heptadecafluorodecyl group, a chloropropyl group, and a chlorophenyl group, wherein a saturated hydrocarbon group having 1 to 5 carbon atoms, a phenyl group, or a trifluoropropyl group is especially preferable.

In the general formula (6), $R^4$ represents an unsubstituted or substituted monovalent hydrocarbon group, preferably an unsubstituted or substituted monovalent hydrocarbon group having 1 to 10 carbon atoms, including saturated aliphatic hydrocarbon groups such as a methyl group, an ethyl group, a propyl group, a butyl group, and a pentyl group; saturated alicyclic hydrocarbon groups such as a cyclopentyl group and a cyclohexyl group; aromatic hydrocarbon groups such as a phenyl group and a tollyl group; and halogenated hydrocarbon groups such as a trifluoropropyl group, a heptadecafluorodecyl group, a chloropropyl group, and a chlorophenyl group, wherein a saturated hydrocarbon group having 1 to 5 carbon atoms, a phenyl group, or a trifluoropropyl group is especially preferable.

In the general formula (2), $X^1$ represents a hydrolysable functional group directly bonded to a silicon atom; and illustrative example thereof includes halogen atoms such as a chlorine atom and a bromine atom; alkoxy groups such as a methoxy group, an ethoxy group, a propoxy group, and a butoxy group; an alkenoxy group; an acyloxy group; an amide group; and an oxime group. Among them, from viewpoints of easy availability and hydrolysis rate, a methoxy group, an ethoxy group, and a chlorine atom are especially preferable.

In the general formula (3), $X^2$ represents a hydrolysable functional group directly bonded to a silicon atom; and illustrative example thereof includes halogen atoms such as a chlorine atom and a bromine atom; alkoxy groups such as a methoxy group, an ethoxy group, a propoxy group, and a butoxy group; an alkenoxy group; an acyloxy group; an amide group; and an oxime group. Among them, an alkoxy group is preferable; and from viewpoints of easy availability and hydrolysis rate, a methoxy group and an ethoxy group are especially preferable. With regard to the hydrolysable group $X^2$ in the same molecule, it does not matter whether they are the same or different.

In the general formula (5), $X^3$ represents a hydrolysable functional group directly bonded to a silicon atom; and illustrative example thereof includes halogen atoms such as a chlorine atom and a bromine atom; alkoxy groups such as a methoxy group, an ethoxy group, a propoxy group, and a butoxy group; an alkenoxy group; an acyloxy group; an amide group; and an oxime group. Among them, from viewpoints of easy availability and hydrolysis rate, a methoxy group, an ethoxy group, and a chlorine atom are especially preferable.

Illustrative example of the organic silicon compound represented by the general formula $R^1_3SiOSiR^1_3$ (1) includes 1,1,1,3,3,3-hexamethyl disiloxane, 1,1,1,3,3,3-hexaphenyl disiloxane, 1,1,3,3-tetramethyl-1,3-divinyl disiloxane, 1,1,1,3,3,3-hexaethyl disiloxane, 1,1,1,3,3,3-hexavinyl disiloxane, 1,1,1,3,3-pentavinylmethyl disiloxane, 1,1,1,3,3-n-octyl pentamethyl disiloxane, 1,1,1,3,3-chloromethyl pentamethyl disiloxane, 1,1,3,3-tetramethyl-1,3-diallyl disiloxane, and 1,3-dimethyl-1,1,3,3-tetravinyl disiloxane. Especially, 1,1,1,3,3,3-hexamethyl disiloxane and 1,1,1,3,3,3-hexaphenyl disiloxane are preferable.

Illustrative example of the organic silicon compound represented by the general formula $R^1_3SiX^1$ (2) includes trimethyl chlorosilane, triethyl chlorosilane, ethyldimethyl chlorosilane, trivinyl chlorosilane, dimethylvinyl chlorosilane, triphenyl chlorosilane, dimethylphenyl chlorosilane, methyldiphenyl chlorosilane, trimethyl methoxysilane, trimethyl ethoxysilane, triethyl methoxysilane, triethyl ethoxysilane, triphenyl methoxysilane, and triphenyl ethoxysilane. Especially, trimethyl chlorosilane and trimethyl ethoxysilane are preferable.

Illustrative example of the hydrolysable silane represented by the general formula $SiX^2_4$ (3) includes tetrachlorosilane, tetramethoxysilane, and tetraethoxysilane. Illustrative example of the partial hydrolysis condensate of the hydrolysable silane includes a tetramethoxy silane condensate and a tetraethoxy silane condensate. Illustrative example of the metal salt of the hydrolysable silane includes water glass, sodium silicate, and potassium silicate. Especially, tetraethoxy silane and a tetraethoxy silane condensate are preferable.

Illustrative example of the hydrosilyl group-containing organic silicon compound represented by the general formula $H_nR^2_{3-n}SiOSiR^2_{3-n}H_n$ (4) includes 1,1,3,3-tetramethyl disiloxane and 1,1,1,3,3-pentamethyl disiloxane. Especially, 1,1,3,3-tetramethyl disiloxane is preferable. Meanwhile, in the general formulae (4) and (5), is 1≤n≤3, wherein in the general formula (4), n pertaining to H and $R^2$ that are bonded to one silicon atom may be the same as or different from n pertaining to H and $R^2$ that are bonded to another silicon atom.

Illustrative example of the hydrosilyl group-containing organic silicon compound represented by the general formula $H_2R^2_{3-n}SiX^3$ (5) includes dimethyl chlorosilane, diphenyl chlorosilane, dimethyl methoxysilane, and dimethyl ethoxysilane. Especially, dimethyl chlorosilane and dimethyl methoxysilane are preferable.

In the present invention, when one, or a mixture of two or more of organic silicon compounds represented by the following general formula (7) is added before hydrolysis of the mixture of one, or two or more of organic silicon compounds represented by the general formulae (1) and (2) with any one or more of a hydrolysable silane represented by the general formula (3), a partial hydrolysis condensate of the hydrolysable silane, and a metal salt of the hydrolysable silane, or after this hydrolysis and before re-hydrolysis, a hydrosilyl group-containing organic silicon resin, which is a powder form without a solvent and represented by the average composition formula (6) wherein 0<d≤1.5, can be obtained, $$(R^3O)_3SiR^4 \qquad (7)$$

wherein $R^4$ represents the same as before; and $R^3$ may be the same or different with each other, representing an unsubstituted or substituted monovalent hydrocarbon group.

In the general formula (7), $R^3$ may be the same or different with each other, representing an unsubstituted or substituted monovalent hydrocarbon group, preferably a monovalent hydrocarbon group having 1 to 10 carbon atoms, including saturated aliphatic hydrocarbon groups such as a methyl group, an ethyl group, a propyl group, a butyl group, and a pentyl group, wherein saturated hydrocarbon groups having 1 to 5 carbon atoms are especially preferable, while a methyl group and an ethyl group are further preferable.

Illustrative example of the silicon compound represented by the general formula $(R^3O)_3SiR^4$ (7) includes methyl trimethoxysilane, methyl triethoxysilane, ethyl trimethoxysilane, pentyl triethoxysilane, phenyl triethoxysilane, benzyl triethoxysilane, chloropropyl triethoxysilane, bromopropyl triethoxysilane, cyclohexyl trimethoxysilane, and trifluoropropyl trimethoxysilane. Especially, methyl trimethoxysilane and methyl triethoxysilane are preferable.

Hereunder, one specific example of the method for producing the hydrosilyl group-containing organic silicon resin in the present invention will be explained.

A solvent (especially an organic solvent) and hydrolysis raw materials (one, or two or more of organic silicon compounds represented by the general formula (1) and the general formula (2), as well as any one or more of a hydrolysable silane represented by the general formula (3), a partial hydrolysis condensate of the hydrolysable silane, and a metal salt of the hydrolysable silane) are taken into a reactor, and to it an acid is added as a catalyst, which is then followed by dropwise addition of water with stirring. Meanwhile, the organic solvent may be added after completion of the dropwise addition of water. Meanwhile, because the hydrolysis is preferably carried out under an acidic condition, addition of the acid catalyst is indispensable.

Meanwhile, temperature at the time of dropwise addition of water is in the range of 0 to 80° C., while especially preferably in the range of 0 to 50° C. Within this temperature range, the heat of reaction derived from the hydrolysis reaction of the hydrolysis raw materials in the system can be suppressed. Amount of water added in dropwise is in the range of 0.6 to 2, while preferably in the range of 1.0 to 1.8, as a molar ratio relative to the hydrolysable functional group (alkoxy group, etc.). Within this range, deactivation of the hydrosilyl group can be further suppressed.

With regard to the solvent to be used in the hydrolysis reaction, an organic solvent is preferably used in order to keep a homogeneous reaction system during the hydrolysis reaction as well as to suppress the decrease in the reaction rate due to increase in the viscosity. A solvent whose boiling point is higher than a reflux temperature during the time of hydrolysis is preferably used.

Illustrative example of the organic solvent includes cyclic organopolysiloxanes such as octamethyl cyclotetrasiloxane, decamethyl cyclopentasiloxane, and dodecamethyl cyclohexasiloxane; aromatic hydrocarbons such as toluene and xylene; ketonic organic solvents such as acetone, methyl ethyl ketone, diethyl ketone, and methyl isobutyl ketone; aliphatic hydrocarbons such as hexane, heptane, octane, and cyclohexane.

Also, as needed, an alcoholic solvent having 1 to 10 carbon atoms can be concurrently used. Illustrative example thereof includes methanol, ethanol, 1-propanol, 2-propanol, 1-butanol, 2-methyl-1-propanol, 2-butanol, 2-methyl-2-propanol, 1-pentanol, 2-methylbutanol, 2-pentanol, 1-hexanol, 2-methylpentanol, 1-heptanol, 1-octanol, 1-nonanol, 1-decanol, phenol, benzyl alcohol, ethylene glycol, and 1,2-propylene glycol. Because the alcoholic solvent undergoes an alcohol-exchange reaction with the hydrolysis group such as the alkoxy group, use of a long-chain alcoholic solvent has an impact on the rate determining of the hydrolysis reaction. Therefore, methanol, ethanol, 1-propanol, and 2-propanol are especially preferable.

Use amount of the solvent is preferably in the range of 1 to 80% (% by weight; the same is applied hereinafter), especially preferably in the range of 5 to 50%, relative to the entire system. Within the above range, homogeneity of the reaction system can be kept, so that the reaction takes place efficiently.

Illustrative example of the acid catalyst includes hydrochloric acid, sulfuric acid, sulfurous acid, fuming sulfuric acid, oxalic acid, p-toluenesulfonic acid, methanesulfonic acid, trifluoromethanesulfonic acid, phosphoric acid, formic acid, acetic acid, propionic acid, benzoic acid, and citric acid. Only a small amount is sufficient in the use amount of the acid catalyst, preferably in the range of 0.001 to 10% relative to the entire system.

After water is added in dropwise as explained above, the hydrolysis reaction is carried out by heating to, for example, in the temperature range of 50 to 150° C., while more preferably in the temperature range of 80 to 120° C. and for the time range of about 2 to 8 hours.

Therefore, after the mixture of one, or two or more of the organic silicon compound represented by the general formula (1) and the general formula (2) with any one or more of the hydrolysable silane represented by the general formula (3), the partial hydrolysis condensate of the hydrolysable silane, and the metal salt of the hydrolysable silane is hydrolyzed in the presence of an acid catalyst, the hydrolyzate is cooled down to 10 to 100° C., preferably to 10 to 60° C., more preferably to 10 to 30° C., while still more preferably to 25° C.; and then, one, or two or more of the hydrosilyl group-containing organic silicon compound represented by the general formulae (4) and (5) is gradually added in dropwise.

Thereafter, the hydrolysis reaction is carried out again. The re-hydrolysis reaction is carried out preferably by heating at a temperature below a boiling point of the hydrosilyl group-containing organic silicon compound to be used, for example, in the temperature range of 40 to 150° C., while more preferably in the temperature range of 40 to 120° C. and for the time range of about 2 to 8 hours. When the reaction is carried out within the temperature range, deactivation of the hydrosilyl group can be further suppressed.

After the re-hydrolysis, neutralization is carried out at 10 to 40° C. by a base catalyst such as an alkaline metal carbonate salt, an alkaline metal hydrogen carbonate, or an alkaline metal hydroxide. At this time, when a strong base catalyst and a weak base catalyst are concurrently used, deactivation of the hydrosilyl group can be further suppressed, and the condensation reaction of the organic silicon resin can be further facilitated. Illustrative example of the strong base catalyst includes lithium hydroxide, sodium hydroxide, potassium hydroxide, calcium hydroxide, and barium hydroxide. Illustrative example of the weak base catalyst includes sodium carbonate, calcium carbonate, and sodium hydrogen carbonate. Especially as a combination of the strong base catalyst and the weak base catalyst, a combination of sodium hydroxide and calcium carbonate is preferable because this combination can readily lead to a higher molecular weight, wherein with this combination, the molecular weight increases sufficiently well, so that the organic silicon resin which is in a solid form can be obtained more surely.

Use amount of the base catalyst needs to be more than a molar equivalent of the acid catalyst. When the neutralization is carried out using the base catalyst with the amount thereof being more than the molar equivalent of the acid catalyst, the condensation reaction of the organic silicon resin takes place preferentially, thereby leading to a higher molecular weight; and thus, the hydrosilyl group-containing organic silicon resin which is in a solid form (for example, powder form) without a solvent can be obtained. In particular, use amount of the base catalyst is preferably in the range of 1.1 to 3.0 molar equivalents relative to the acid catalyst. When the addition amount is made within the range, the condensation reaction of the organic silicon resin takes place preferentially; and as a result, the resin with a target molecular weight can be obtained.

After the neutralization, alcohols generated, the solvent, and excess water may be removed under normal pressure or reduced pressure, or by heating at 95 to 120° C. After confirmation of removal of the alcohol generated, the solvent, and excess water, the condensation reaction is carried out by heating, for example, at 120 to 150° C. for about 2 to 5 hours. By so doing, the hydrosilyl group-containing organic silicon resin can be obtained.

On the other hand, when a base is used as the neutralization agent, there is a possibility that the reaction formula (8) takes place in which part of the hydrosilyl group is deactivated,

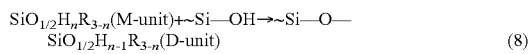
$$\mathrm{SiO}_{1/2}\mathrm{H}_n\mathrm{R}_{3-n}(\text{M-unit}) + \sim\mathrm{Si}\text{—}\mathrm{OH} \rightarrow \sim\mathrm{Si}\text{—}\mathrm{O}\text{—}\mathrm{SiO}_{1/2}\mathrm{H}_{n-1}\mathrm{R}_{3-n}(\text{D-unit}) \qquad (8)$$

wherein R represents a monovalent hydrocarbon group having 1 to 10 carbon atoms; and n represents an integer of 1 to 3.

The D-unit formed by the above reaction is observed as a broad peak at −10 to −20 ppm in the $^{29}$Si—NMR analysis. However, in the hydrosilyl group-containing organic silicon resin obtained by the method for producing the hydrosilyl group-containing organic silicon resin of the present invention, when the addition order of the raw materials shown below is followed, the chance of the reaction (8) can be suppressed to extremely small. Namely, after hydrolysis of a mixture of the organic silicon compound represented by the general formula (1) and/or the general formula (2) with the hydrolysable silane represented by the general formula (3) or the like, the hydrosilyl group-containing organic silicon compound represented by the general formula (4) and/or the general formula (5) is added thereto, and then, the hydrolysis reaction is carried out again. By investing the addition amounts of the raw materials and kinds of the catalyst, this reaction can be further suppressed. Therefore, in the hydrosilyl group-containing organic silicon resin thereby obtained, the integral value of the peak at −10 to −20 ppm in the $^{29}$Si—NMR analysis can be suppressed to 1.0% or less, even to 0.1% or less, relative to total integral value of the entire silicon.

In the method for producing the hydrosilyl group-containing organic silicon resin of the present invention, the use ratio of the total mass of the compounds represented by the general formulae (1), (2), (4) and (5) to the total mass of the $\mathrm{SiO}_2$ unit and/or the $\mathrm{R}^4\mathrm{SiO}_{3/2}$ unit of the compounds represented by the general formulae (3) and (7) is preferably in the range of 0.3:1 to 2:1, in particular in the range of 0.6:1 to 1.3:1, as a molar ratio. In addition, the use ratio of the total mass of the compounds represented by the general formulae (1) and (2) to the total mass of the compounds represented by the general formulae (4) and (5) is preferably in the range of 0.3:1.0 to 2.0:1.0, in particular in the range of 0.6:1.0 to 1.3:1.0, as a molar ratio. Within the range mentioned above, the amount of the hydrosilyl group included in the organic silicon resin can be changed more accurately and quantitatively. Therefore, in the present invention, by changing the charging amount of the formulae (4) and (5) in the way as mentioned above, the amount of the hydrosilyl group included in the organic silicon resin can be changed quantitatively.

The method for producing the hydrosilyl group-containing organic silicon resin of the present invention is a prescription characterized by how to reduce the deactivation amount of the hydrosilyl group therein. In addition, by changing the charging amounts of the hydrosilyl group-containing organic silicon compounds, the amount of the hydrosilyl group included in the organic silicon resin can be controlled more readily, so that a large quantity thereof can be introduced as well, as compared with a conventional prescription. In addition, the molecular weight distribution, form, etc., of the organic silicon resin can be controlled by changing the blending amounts of the hydrolysis raw materials, the kind and addition amount of the acid catalyst, the reaction temperature, the reaction time, and the addition amount and addition method of the solvent; and thus, the organic silicon resin in accordance with the use can be produced.

The hydrosilyl group-containing organic silicon resin produced by the method for producing the hydrosilyl group-containing organic silicon resin of the present invention is represented by the average composition formula (6), comprising the Q-unit ($\mathrm{SiO}_2$) and the M-unit (($\mathrm{R}^1_3\mathrm{SiO}_{1/2}$) and ($\mathrm{H}_n\mathrm{R}^2_{3-n}\mathrm{SiO}_{1/2}$)) as essential components, and the T-unit ($\mathrm{R}^4\mathrm{SiO}_{3/2}$) as an arbitrary component, and is in a solid form at room temperature without a solvent. For example, the MQ resin, the MTQ resin, etc. may be mentioned. In view of the performance thereof, workability such as filterability, and the like, the weight average molecular weight thereof is preferably in the range of 2000 to 30000, while more preferably in the range of 3000 to 15000. Meanwhile, the weight average molecular weight can be obtained by a gel permeation chromatography (GPC) as the polystyrene-converted weight average molecular weight.

The hydrosilyl group-containing organic silicon resin produced by the method for producing the hydrosilyl group-containing organic silicon resin of the present invention can undergo a hydrosilylation reaction with a compound having an alkenyl group (carbon-carbon unsaturated bond) at its terminal. Illustrative example of the compound having the unsaturated bond at the terminal thereof includes ethylene, propylene, 1-butene, 1-hexene, polyethylene glycol monoallyl ether, polypropylene glycol monoallyl ether, polyethylene glycol diallyl ether, allyl glycidyl ether, allyl alcohol, allylbenzene, allylamine, allyl isothiocyanate, allyl bromide, and allyl chloride. By modification with the functional group like these, new characteristics can be added.

EXAMPLE

Hereunder, the present invention will be specifically explained by Examples; however, the present invention is not limited to the following Examples.

Meanwhile, quantification of the hydrosilyl group in the organic silicon resin was made as follows. First, after 1 g of sample was taken into an Erlenmeyer flask, 1-butanol was added to and mixed with it. Next, an aqueous 25% by weight NaOH solution was added to it in dropwise; and the hydrogen gas generated in this process was measured (Si—H+ $\mathrm{H_2O} \rightarrow \mathrm{Si}$—$\mathrm{OH}+\mathrm{H_2}\uparrow$). Identification of the Si environment was done by using NMR ECX500 (manufactured by JEOL Ltd.) under the measurement condition with the integration number of 1000 times by using deuterated chloroform as the deuterated solvent.

Example 1

Into a reaction vessel were taken 50 g (0.31 mole) of hexamethyl disiloxane, 180 g of ethyl polysilicate comprising 40% of the SiO$_2$ component and 60% of the (SiOEt)$_3$SiO$_{1/2}$ component (1.2 mole of the SiO$_2$ component in ethyl polysilicate*), and 150 g of decamethyl cyclopentasiloxane; and then, after 1.2 g (12.5 mmole) of methanesulfonic acid was added to it, the resulting solution was cooled to 10 to 20° C. Then, 42.6 g (2.36 mole) of water was added in dropwise to the solution with stirring. After completion of the dropwise addition, the hydrolysis reaction was carried out by heating at 70 to 90° C. for 6 hours. Thereafter, 30 g (0.22 mole) of tetramethyl disiloxane was gradually added in dropwise into the reaction vessel heated at 70 to 90° C.; and then, the hydrolysis reaction was carried out by heating for 4 hours. After completion of the hydrolysis, the reaction solution was cooled to room temperature, and then the acid was neutralized by adding 1.92 g (12.0 mmole) of 25% by weight sodium hydroxide aqueous solution and 0.25 g (2.5 mmole) of calcium carbonate, followed by heating until 120° C. to remove ethanol formed by the hydrolysis and excess water. After complete removal of the solvent by distillation was confirmed, the condensation reaction was carried out by heating at 150° C. for 5 hours. After being diluted by decamethyl cyclopentasiloxane, filtration was carried out to obtain 330 g of the decamethyl cyclopentasiloxane solution containing 50% of the hydrosilyl group-containing organic silicon resin.

* Mass as well as amount of substance of SiO$_2$ was calculated from total mass of ethyl polysilicate. Ex.) Q-unit amount in 180 g of ethyl polysilicate containing 40% of SiO$_2$ component=180×0.4/60 (Mw of SiO$_2$)=1.2 mol (hereinafter, the same calculation method is applied)

Under reduced pressure, 330 g of the decamethyl cyclopentasiloxane solution of the hydrosilyl group-containing organic silicon resin thus obtained was heated at 120 to 130° C. to remove decamethyl cyclopentasiloxane to obtain 160 g of the hydrosilyl group-containing organic silicon resin (weight average molecular weight of 5500) in the form of powder, shown by (Me$_3$SiO$_{1/2}$)$_{22.5}$(HMe$_2$SiO$_{1/2}$)$_{16.0}$(SiO$_2$)$_{43.5}$ (in the average composition formula (6), a=0.31, b=0.22, c=0.60, and d=0). The amount of hydrogen gas generation was measured to be 64.5 mL/g (theoretical value of the hydrogen gas generation amount: 65.8 mL/g). In the Si—NMR analysis of the product, the integral value of the peak at −10 to −20 ppm was 0.7% relative to total integral value of the entire silicon.

Example 2

Into a reaction vessel were taken 50 g (0.31 mole) of hexamethyl disiloxane, 180 g of ethyl polysilicate containing 40% of the SiO$_2$ component (1.2 mole of the SiO$_2$ component in ethyl polysilicate*), and 80 g of isopropanol; and then, after 1.2 g (12.5 mmole) of methanesulfonic acid was added to it, the resulting solution was cooled to 10 to 20° C. Then, 42.6 g (2.36 mole) of water was added in dropwise to the solution with stirring. After completion of the dropwise addition, the hydrolysis reaction was carried out by heating at 70 to 90° C. for 6 hours. Thereafter, 30 g (0.22 mole) of tetramethyl disiloxane was gradually added in dropwise into the reaction vessel heated at 70 to 90° C.; and then, the hydrolysis reaction was carried out by heating for 4 hours. After completion of the hydrolysis, the reaction solution was cooled to room temperature and then the acid was neutralized by adding 1.92 g (12.0 mmole) of 25% by weight sodium hydroxide aqueous solution and 0.25 g (2.5 mmole) of calcium carbonate. And then, after 140 g of decamethyl cyclopentasiloxane was added to the neutralized solution, it was heated until 120° C. to remove ethanol formed by the hydrolysis, isopropanol, and excess water. After complete removal of the solvent by distillation was confirmed, the condensation reaction was carried out by heating at 150° C. for 5 hours. After being diluted by decamethyl cyclopentasiloxane, filtration was carried out to obtain 320 g of the decamethyl cyclopentasiloxane solution containing 50% of the hydrosilyl group-containing organic silicon resin. Under reduced pressure, 320 g of the decamethyl cyclopentasiloxane solution of the hydrosilyl group-containing organic silicon resin thus obtained was heated at 120 to 130° C. to remove decamethyl cyclopentasiloxane to obtain 145 g of the hydrosilyl group-containing organic silicon resin (weight average molecular weight of 5500) in the form of powder, shown by (Me$_3$SiO$_{1/2}$)$_{22.5}$(HMe$_2$SiO$_{1/2}$)$_{16.0}$(SiO$_2$)$_{43.5}$ (in the average composition formula (6), a=0.31, b=0.22, c=0.60, and d=0). The amount of hydrogen gas generation was measured to be 64.9 mL/g (theoretical value of the hydrogen gas generation amount: 65.8 mL/g). In the Si—NMR analysis of the product, the integral value of the peak at −10 to −20 ppm was 0.5% relative to total integral value of the entire silicon.

Example 3

Into a reaction vessel were taken 41.7 g (0.26 mole) of hexamethyl disiloxane, 180 g of ethyl polysilicate containing 40% of the SiO$_2$ component (1.2 mole of the SiO$_2$ component in ethyl polysilicate*), and 80 g of isopropanol; and then, after 1.2 g (12.5 mmole) of methanesulfonic acid was added to it, the resulting solution was cooled to 10 to 20° C. Then, 42.6 g (2.36 mole) of water was added in dropwise to the solution with stirring. After completion of the dropwise addition, the hydrolysis reaction was carried out by heating at 70 to 90° C. for 6 hours. Thereafter, 25 g (0.19 mole) of tetramethyl disiloxane was gradually added in dropwise into the reaction vessel heated at 70 to 90° C.; and then, the hydrolysis reaction was carried out by heating for 4 hours. After completion of the hydrolysis, the reaction solution was cooled to room temperature and then the acid was neutralized by adding 1.92 g (12.0 mmole) of 25% by weight sodium hydroxide aqueous solution and 0.25 g (2.5 mmole) of calcium carbonate. And then, after 140 g of decamethyl cyclopentasiloxane was added to the neutralized solution, it was heated until 120° C. to remove ethanol formed by the hydrolysis, isopropanol, and excess water. After complete removal of the solvent by distillation was confirmed, the condensation reaction was carried out by heating at 150° C. for 5 hours. After being diluted by decamethyl cyclopentasiloxane, filtration was carried out to obtain 260 g of the decamethyl cyclopentasiloxane solution containing 50% of the hydrosilyl group-containing organic silicon resin. Under reduced pressure, 260 g of the decamethyl cyclopentasiloxane solution of the hydrosilyl group-containing organic silicon resin thus obtained was heated at 120 to 130° C. to remove decamethyl cyclopentasiloxane to obtain 110 g of the hydrosilyl group-containing organic silicon resin (weight average molecular weight of 16500) in the form of powder, shown by (Me$_3$SiO$_{1/2}$)$_{61.5}$(HMe$_2$SiO$_{1/2}$)$_{44.9}$(SiO$_2$)$_{141.8}$ (in the average composition formula (6), a=0.31, b=0.23, c=0.71, and d=0). The amount of hydrogen gas generation was measured to be 58.6 mL/g (theoretical value of the hydrogen gas generation amount: 60.1 mL/g). In the Si—NMR analysis of the product, the integral value of the peak at −10 to −20 ppm was 0.8% relative to total integral value of the entire silicon.

Example 4

Into a reaction vessel were taken 67.4 g (0.62 mole) of trimethyl chlorosilane, 180 g of ethyl polysilicate containing 40% of the SiO$_2$ component (1.2 mole of the SiO$_2$ component in ethyl polysilicate*), and 80 g of isopropanol; and then, after 1.2 g (12.5 mmole) of methanesulfonic acid was added to it, the resulting solution was cooled to 10 to 20° C. Then, 42.6 g (2.36 mole) of water was added in dropwise to the solution with stirring. After completion of the dropwise addition, the hydrolysis reaction was carried out by heating at 70 to 90° C. for 6 hours. Thereafter, 41.6 g (0.44 mole) of dimethylchlorosilane was gradually added in dropwise into the reaction vessel heated at 70 to 90° C.; and then, the hydrolysis reaction was carried out by heating for 4 hours. After completion of the hydrolysis, the reaction solution was cooled to room temperature and then the acid was neutralized by adding 1.92 g (12.0 mmole) of 25% by weight sodium hydroxide aqueous solution and 0.25 g (2.5 mmole) of calcium carbonate. And then, after 140 g of decamethyl cyclopentasiloxane was added to the neutralized solution, it was heated until 120° C. to remove ethanol formed by the hydrolysis, isopropanol, and excess water. After complete removal of the solvent by distillation was confirmed, the condensation reaction was carried out by heating at 150° C. for 5 hours. After being diluted by decamethyl cyclopentasiloxane, filtration was carried out to obtain 300 g of the decamethyl cyclopentasiloxane solution containing 50% of the hydrosilyl group-containing organic silicon resin. Under reduced pressure, 300 g of the decamethyl cyclopentasiloxane solution of the hydrosilyl group-containing organic silicon resin thus obtained was heated at 120 to 130° C. to remove decamethyl cyclopentasiloxane to obtain 130 g of the hydrosilyl group-containing organic silicon resin (weight average molecular weight of 6600) in the form of powder, shown by (Me$_3$SiO$_{1/2}$)$_{27.0}$(HMe$_2$SiO$_{1/2}$)$_{19.1}$(SiO$_2$)$_{52.2}$ (in the average composition formula (6), a=0.31, b=0.22, c=0.60, and d=0). The amount of hydrogen gas generation was measured to be 64.3 mL/g (theoretical value of the hydrogen gas generation amount: 65.8 mL/g). In the Si—NMR analysis of the product, the integral value of the peak at −10 to −20 ppm was 0.7% relative to total integral value of the entire silicon.

Example 5

Into a reaction vessel were taken 20 g (0.12 mole) of hexamethyl disiloxane, 180 g of ethyl polysilicate containing 40% of the SiO$_2$ component (1.2 mole of the SiO$_2$ component in ethyl polysilicate*), and 150 g of decamethyl cyclopentasiloxane; and then, after 1.2 g (12.5 mmole) of methanesulfonic acid was added to it, the resulting solution was cooled to 10 to 20° C. Then, 42.6 g (2.36 mole) of water was added in dropwise to the solution with stirring. After completion of the dropwise addition, the hydrolysis reaction was carried out by heating at 70 to 90° C. for 6 hours. Thereafter, 55 g (0.41 mole) of tetramethyl disiloxane was gradually added in dropwise into the reaction vessel heated at 70 to 90° C.; and then, the hydrolysis reaction was carried out by heating for 4 hours. After completion of the hydrolysis, the reaction solution was cooled to room temperature and then the acid was neutralized by adding 1.92 g (12.0 mmole) of 25% by weight sodium hydroxide aqueous solution and 0.25 g (2.5 mmole) of calcium carbonate, followed by heating until 120° C. to remove ethanol formed by the hydrolysis and excess water. After complete removal of the solvent by distillation was confirmed, the condensation reaction was carried out by heating at 150° C. for 5 hours. After being diluted by decamethyl cyclopentasiloxane, filtration was carried out to obtain 315 g of the decamethyl cyclopentasiloxane solution containing 50% of the hydrosilyl group-containing organic silicon resin. Under reduced pressure, 315 g of the decamethyl cyclopentasiloxane solution of the hydrosilyl group-containing organic silicon resin thus obtained was heated at 120 to 130° C. to remove decamethyl cyclopentasiloxane to obtain 145 g of the hydrosilyl group-containing organic silicon resin (weight average molecular weight of 5500) in the form of powder, shown by (Me$_3$SiO$_{1/2}$)$_{9.0}$(HMe$_2$SiO$_{1/2}$)$_{30.8}$(SiO$_2$)$_{45.1}$ (in the average composition formula (6), a=0.12, b=0.41, c=0.60, and d=0). The amount of hydrogen gas generation was measured to be 121.8 mL/g (theoretical value of the hydrogen gas generation amount: 123.5 mL/g). In the Si—NMR analysis of the product, the integral value of the peak at −10 to −20 ppm was 0.9% relative to total integral value of the entire silicon.

Example 6

Into a reaction vessel were taken 50 g (0.31 mole) of hexamethyl disiloxane, 180 g of ethyl polysilicate containing 40% of the SiO$_2$ component (1.2 mole of the SiO$_2$ component in ethyl polysilicate*), and 80 g of isopropanol; and then, after 1.2 g (12.5 mmole) of methanesulfonic acid was added to it, the resulting solution was cooled to 10 to 20° C. Then, 42.6 g (2.36 mole) of water was added in dropwise to the solution with stirring. After completion of the dropwise addition, the hydrolysis reaction was carried out by heating at 70 to 90° C. for 6 hours. Thereafter, the reaction vessel was cooled to room temperature (25° C.), and to it, 30 g (0.22 mole) of tetramethyl disiloxane was gradually added in dropwise; and then, the hydrolysis was carried out by heating at 40 to 50° C. for 4 hours. After completion of the hydrolysis, the reaction solution was cooled to room temperature and then the acid was neutralized by adding 1.92 g (12.0 mmole) of 25% by weight sodium hydroxide aqueous solution and 0.25 g (2.5 mole) of calcium carbonate. And then, after 140 g of decamethyl cyclopentasiloxane was added to the neutralized solution, it was heated until 120° C. to remove ethanol formed by the hydrolysis, isopropanol, and excess water. After complete removal of the solvent by distillation was confirmed, the condensation reaction was carried out by heating at 150° C. for 5 hours. After being diluted by decamethyl cyclopentasiloxane, filtration was carried out to obtain 320 g of the decamethyl cyclopentasiloxane solution containing 50% of the hydrosilyl group-containing organic silicon resin. Under reduced pressure, 320 g of the decamethyl cyclopentasiloxane solution of the hydrosilyl group-containing organic silicon resin thus obtained was heated at 120 to 130° C. to remove decamethyl cyclopentasiloxane to obtain 145 g of the hydrosilyl group-containing organic silicon resin (weight average molecular weight of 5800) in the form of powder, shown by (Me$_3$SiO$_{1/2}$)$_{23.7}$(HMe$_2$SiO$_{1/2}$)$_{16.8}$(SiO$_2$)$_{45.9}$ (in the average composition formula (6), a=0.31, b=0.22, c=0.6, and d=0). The amount of hydrogen gas generation was measured to be 65.3 mL/g (theoretical value of the hydrogen gas generation amount: 65.8 mL/g). In the Si—NMR analysis of the product, the integral value of the peak at −10 to −20 ppm was 0.06% relative to total integral value of the entire silicon.

Example 7

Into a reaction vessel were taken 50 g (0.31 mole) of hexamethyl disiloxane, 180 g of ethyl polysilicate containing 40% of the SiO$_2$ component (1.2 mole of the SiO$_2$ component in ethyl polysilicate*), and 80 g of isopropanol;

and then, after 1.2 g (12.5 mmole) of methanesulfonic acid was added to it, the resulting solution was cooled to 10 to 20° C. Then, 42.6 g (2.36 mole) of water was added in dropwise to the solution with stirring. After completion of the dropwise addition, the hydrolysis reaction was carried out by heating at 70 to 90° C. for 6 hours. Thereafter, the reaction vessel was cooled to room temperature, and to it, 30 g (0.22 mole) of tetramethyl disiloxane was gradually added in dropwise; and then, the hydrolysis was carried out by heating at 40 to 50° C. for 4 hours. After completion of the hydrolysis, the reaction solution was cooled to room temperature and then the acid was neutralized by adding 2.35 g (14.7 mmole) of 25% by weight sodium hydroxide aqueous solution and 0.25 g (2.5 mmole) of calcium carbonate. And then, after 140 g of decamethyl cyclopentasiloxane was added to the neutralized solution, it was heated until 120° C. to remove ethanol formed by the hydrolysis, isopropanol, and excess water. After complete removal of the solvent by distillation was confirmed, the condensation reaction was carried out by heating at 150° C. for 5 hours. After being diluted by decamethyl cyclopentasiloxane, filtration was carried out to obtain 320 g of the decamethyl cyclopentasiloxane solution containing 50% of the hydrosilyl group-containing organic silicon resin. Under reduced pressure, 320 g of the decamethyl cyclopentasiloxane solution of the hydrosilyl group-containing organic silicon resin thus obtained was heated at 120 to 130° C. to remove decamethyl cyclopentasiloxane to obtain 145 g of the hydrosilyl group-containing organic silicon resin (weight average molecular weight of 13500) in the form of powder, shown by $(Me_3SiO_{1/2})_{55.2}(HMe_2SiO_{1/2})_{39.2}(SiO_2)_{106.8}$ (in the average composition formula (6), a=0.31, b=0.22, c=0.60, and d=0). The amount of hydrogen gas generation was measured to be 65.1 mL/g (theoretical value of the hydrogen gas generation amount: 65.8 mL/g). In the Si—NMR analysis of the product, the integral value of the peak at −10 to −20 ppm was 0.08% relative to total integral value of the entire silicon.

Comparative Example

Into a reaction vessel were taken 50 g (0.31 mole) of hexamethyl disiloxane, 30 g (0.22 mole) of tetramethyl disiloxane, 180 g of ethyl polysilicate containing 40% of the $SiO_2$ component (1.2 mole of the $SiO_2$ component in ethyl polysilicate*), and 80 g of isopropanol; and then, after 1.2 g (12.5 mmole) of methanesulfonic acid was added to it, the resulting solution was cooled to 10 to 20° C. Then, 42.6 g (2.36 mole) of water was added in dropwise to the solution with stirring. After completion of the dropwise addition, the hydrolysis reaction was carried out by heating at 70 to 90° C. for 6 hours. Thereafter, the reaction vessel was cooled to room temperature, and then, the acid was neutralized by adding 1.92 g (12.0 mmole) of 25% by weight sodium hydroxide aqueous solution and 0.25 g (2.5 mmole) of calcium carbonate. And then, after 140 g of decamethyl cyclopentasiloxane was added to the neutralized solution, it was heated until 120° C. to remove ethanol formed by the hydrolysis, isopropanol, and excess water. After complete removal of the solvent by distillation was confirmed, the resulting solution was heated at 150° C. for 5 hours. After being diluted by decamethyl cyclopentasiloxane, filtration was carried out to obtain 320 g of the decamethyl cyclopentasiloxane solution containing 50% of the hydrosilyl group-containing organic silicon resin. Under reduced pressure, 320 g of the decamethyl cyclopentasiloxane solution of the hydrosilyl group-containing organic silicon resin thus obtained was heated at 120 to 130° C. to remove decamethyl cyclopentasiloxane to obtain 150 g of the hydrosilyl group-containing organic silicon resin (weight average molecular weight of 6300) in the form of powder, shown by the average composition formula of $(Me_3SiO_{1/2})_{25.7}(HMe_2SiO_{1/2})_{18.3}(SiO_2)_{49.8}$. The amount of hydrogen gas generation was measured to be 61.1 mL/g (theoretical value of the hydrogen gas generation amount: 65.8 mL/g). In the Si—NMR analysis of the product, the integral value of the peak at −10 to −20 ppm was 3.6% relative to total integral value of the entire silicon.

In the hydrosilyl group-containing organic silicon resin produced by the method for producing the hydrosilyl group-containing organic silicon resin of the present invention (Examples 1 to 7), deactivation amount of the hydrosilyl group could be reduced as compared with the hydrosilyl group-containing organic silicon resin produced by the method in which all the raw materials of hydrolysable silanes are simultaneously hydrolyzed (Comparative Example).

It must be noted here that the present invention is not limited to the embodiments as described above. The foregoing embodiments are mere examples; any form having substantially the same composition as the technical idea described in claims of the present invention and showing similar effects is included in the technical scope of the present invention.

The invention claimed is:

1. A method for producing a hydrosilyl group-containing organic silicon resin, wherein after a mixture of one, or two or more of organic silicon compounds represented by following general formulae (1) and (2) with any one or more of a hydrolysable silane represented by following general formula (3), a partial hydrolysis condensate of the hydrolysable silane, and a metal salt of the hydrolysable silane is hydrolyzed in a presence of an acid catalyst, to a hydrolyzate thereby obtained, one, or two or more of hydrosilyl group-containing organic silicon compounds represented by following general formulae (4) and (5) is added, which is then followed by re-hydrolysis, and thereafter, neutralization is done by adding a base catalyst with an amount of more than a molar equivalent of the acid catalyst, which is followed by condensation to obtain a hydrosilyl group-containing organic silicon resin represented by following average composition formula (6), which contains a Q-unit ($SiO_2$) and an M-unit (($R^1_3SiO_{1/2}$) and ($H_nR^2_{3-n}SiO_{1/2}$)) as essential components, and which is in a solid form without a solvent, $$R^1_3SiOSiR^1_3 \quad (1)$$

$$R^1_3SiX^1 \quad (2)$$

wherein $R^1$ may be the same or different with each other, representing an unsubstituted or substituted monovalent hydrocarbon group; and $X^1$ represents a hydrolysable functional group, $$SiX^2_4 \quad (3)$$

wherein $X^2$ represents a hydrolysable functional group, $$H_nR^2_{3-n}SiOSiR^2_{3-n}H_n \quad (4)$$

$$H_nR^2_{3-n}SiX^3 \quad (5)$$

wherein $R^2$ may be the same or different with each other, representing an unsubstituted or substituted monovalent hydrocarbon group; $X^3$ represents a hydrolysable functional group; and $1 \leq n \leq 3$, and $$(R^1{}_3SiO_{1/2})_a(H_nR^2{}_{3-n}SiO_{1/2})_b(SiO_2)_c \qquad (6)$$

wherein $R^1$, $R^2$ and "n" represents the same as before; and $0 < a \leq 1.5$, $0.2 \leq b \leq 1.5$, $0 < c \leq 1.0$, and $0.5 \leq a+b/c \leq 1.0$.

2. The method for producing the hydrosilyl group-containing organic silicon resin according to claim 1, wherein in a $^{29}$Si—NMR analysis of the produced hydrosilyl group-containing organic silicon resin, an integral value of the peak between −10 and −20 ppm is 1.0% or less relative to total integral value of the entire silicon.

3. The method for producing the hydrosilyl group-containing organic silicon resin according to claim 1, wherein in a $^{29}$Si—NMR analysis of the produced hydrosilyl group-containing organic silicon resin, an integral value of the peak between −10 and −20 ppm is 0.1% or less relative to total integral value of the entire silicon.

4. The method for producing the hydrosilyl group-containing organic silicon resin according to claim 1, wherein after the mixture of one, or two or more of the organic silicon compounds represented by the general formulae (1) and (2) with any one or more of the hydrolysable silane represented by the general formula (3), the partial hydrolysis condensate of the hydrolysable silane, and the metal salt of the hydrolysable silane, is hydrolyzed in the presence of the acid catalyst, the hydrolyzate is cooled down to 25° C.; and then, after the hydrosilyl group-containing organic silicon compound is added, re-hydrolysis is carried out at a temperature below a boiling point of the used hydrosilyl group-containing organic silicon compound.

5. The method for producing the hydrosilyl group-containing organic silicon resin according to claim 2, wherein after the mixture of one, or two or more of the organic silicon compounds represented by the general formulae (1) and (2) with any one or more of the hydrolysable silane represented by the general formula (3), the partial hydrolysis condensate of the hydrolysable silane, and the metal salt of the hydrolysable silane, is hydrolyzed in the presence of the acid catalyst, the hydrolyzate is cooled down to 25° C.; and then, after the hydrosilyl group-containing organic silicon compound is added, re-hydrolysis is carried out at a temperature below a boiling point of the used hydrosilyl group-containing organic silicon compound.

6. The method for producing the hydrosilyl group-containing organic silicon resin according to claim 3, wherein after the mixture of one, or two or more of the organic silicon compounds represented by the general formulae (1) and (2) with any one or more of the hydrolysable silane represented by the general formula (3), the partial hydrolysis condensate of the hydrolysable silane, and the metal salt of the hydrolysable silane, is hydrolyzed in the presence of the acid catalyst, the hydrolyzate is cooled down to 25° C.; and then, after the hydrosilyl group-containing organic silicon compound is added, re-hydrolysis is carried out at a temperature below a boiling point of the used hydrosilyl group-containing organic silicon compound.

7. The method for producing the hydrosilyl group-containing organic silicon resin according to claim 1, wherein in neutralization by using the base catalyst, sodium hydroxide as a strong base catalyst and calcium carbonate as a weak base catalyst are concurrently used.

8. The method for producing the hydrosilyl group-containing organic silicon resin according to claim 2, wherein in neutralization by using the base catalyst, sodium hydroxide as a strong base catalyst and calcium carbonate as a weak base catalyst are concurrently used.

9. The method for producing the hydrosilyl group-containing organic silicon resin according to claim 3, wherein in neutralization by using the base catalyst, sodium hydroxide as a strong base catalyst and calcium carbonate as a weak base catalyst are concurrently used.

10. The method for producing the hydrosilyl group-containing organic silicon resin according to claim 4, wherein in neutralization by using the base catalyst, sodium hydroxide as a strong base catalyst and calcium carbonate as a weak base catalyst are concurrently used.

11. The method for producing the hydrosilyl group-containing organic silicon resin according to claim 5, wherein in neutralization by using the base catalyst, sodium hydroxide as a strong base catalyst and calcium carbonate as a weak base catalyst are concurrently used.

12. The method for producing the hydrosilyl group-containing organic silicon resin according to claim 6, wherein in neutralization by using the base catalyst, sodium hydroxide as a strong base catalyst and calcium carbonate as a weak base catalyst are concurrently used.

13. A method for producing a hydrosilyl group-containing organic silicon resin, wherein after a mixture of one, or two or more of organic silicon compounds represented by following general formulae (1) and (2) with any one or more of a hydrolysable silane represented by following general formula (3), a partial hydrolysis condensate of the hydrolysable silane, and a metal salt of the hydrolysable silane is hydrolyzed in a presence of an acid catalyst, to a hydrolyzate thereby obtained, one, or two or more of hydrosilyl group-containing organic silicon compounds represented by following general formulae (4) and (5) is added, which is then followed by re-hydrolysis, and thereafter, neutralization is done by adding a base catalyst with an amount of more than a molar equivalent of the acid catalyst, which is followed by condensation to obtain a hydrosilyl group-containing organic silicon resin represented by following average composition formula (6'), which contains a Q-unit ($SiO_2$) and an M-unit (($R^1{}_3SiO_{1/2}$) and ($H_nR^2{}_{3-n}SiO_{1/2}$)) as essential components, and which is in a solid form without a solvent;

wherein one, or a mixture of two or more of organic silicon compounds represented by following general formula (7) is further added before hydrolysis of the mixture of one, or two or more of the organic silicon compounds represented by the general formulae (1) and (2) with any one or more of the hydrolysable silane represented by the general formula (3), the partial hydrolysis condensate of the hydrolysable silane, and the metal salt of the hydrolysable silane, or after this hydrolysis and before re-hydrolysis, the hydrosilyl group-containing organic silicon resin, which is a powder form without a solvent is obtained, $$R^1{}_3SiOSiR^1{}_3 \qquad (1)$$

$$R^1{}_3SiX^1 \qquad (2)$$

wherein $R^1$ may be the same or different with each other, representing an unsubstituted or substituted monovalent hydrocarbon group; and $X^1$ represents a hydrolysable functional group, $$SiX^2{}_4 \qquad (3)$$

wherein $X^2$ represents a hydrolysable functional group, $$H_nR^2{}_{3-n}SiOSiR^2{}_{3-n}H_n \quad (4)$$

$$H_nR^2{}_{3-n}SiX^3 \quad (5)$$

wherein $R^2$ may be the same or different with each other, representing an unsubstituted or substituted monovalent hydrocarbon group; $X^3$ represents a hydrolysable functional group; and $1 \le n \le 3$, $$(R^1{}_3SiO_{1/2})_a(H_nR^2{}_{3-n}SiO_{1/2})_b(SiO_2)_c(R^4SiO_{3/2})_d \quad (6')$$

wherein $R^1$, $R^2$ and "n" represents the same as before; $R^4$ represents an unsubstituted or substituted monovalent hydrocarbon group; and $0 < a \le 1.5$, $0.2 \le b \le 1.5$, $0 < c \le 1.0$, $0 < d \le 1.5$, and $0.5 \le a+b/c \le 1.0$, and $$(R^3O)_3SiR^4 \quad (7)$$

wherein $R^4$ represents the same as before; and $R^3$ may be the same or different with each other, representing an unsubstituted or substituted monovalent hydrocarbon group.

14. A method for producing a hydrosilyl group-containing organic silicon resin, wherein
after a mixture of one, or two or more of organic silicon compounds represented by following general formulae (1) and (2) with any one or more of a hydrolysable silane represented by following general formula (3), a partial hydrolysis condensate of the hydrolysable silane, and a metal salt of the hydrolysable silane is hydrolyzed in a presence of an acid catalyst,
to a hydrolyzate thereby obtained, one, or two or more of hydrosilyl group-containing organic silicon compounds represented by following general formulae (4) and (5) is added, which is then followed by re-hydrolysis,
and thereafter, neutralization is done by adding a base catalyst with an amount of more than a molar equivalent of the acid catalyst,
which is followed by condensation to obtain a hydrosilyl group-containing organic silicon resin represented by following average composition formula (6'), which contains a Q-unit ($SiO_2$) and an M-unit (($R^1{}_3SiO_{1/2}$) and ($H_nR^2{}_{3-n}SiO_{1/2}$)) as essential components, and which is in a solid form without a solvent;
wherein one, or a mixture of two or more of organic silicon compounds represented by following general formula (7) is further added before hydrolysis of the mixture of one, or two or more of the organic silicon compounds represented by the general formulae (1) and (2) with any one or more of the hydrolysable silane represented by the general formula (3), the partial hydrolysis condensate of the hydrolysable silane, and the metal salt of the hydrolysable silane, or after this hydrolysis and before re-hydrolysis, the hydrosilyl group-containing organic silicon resin, which is a powder form without a solvent is obtained, $$R^1{}_3SiOSiR^1{}_3 \quad (1)$$

$$R^1{}_3SiX^1 \quad (2)$$

wherein $R^1$ may be the same or different with each other, representing an unsubstituted or substituted monovalent hydrocarbon group; and $X^1$ represents a hydrolysable functional group, $$SiX^2{}_4 \quad (3)$$

wherein $X^2$ represents a hydrolysable functional group, $$H_nR^2{}_{3-n}SiOSiR^2{}_{3-n}H_n \quad (4)$$

$$H_nR^2{}_{3-n}SiX^3 \quad (5)$$

wherein $R^2$ may be the same or different with each other, representing an unsubstituted or substituted monovalent hydrocarbon group; $X^3$ represents a hydrolysable functional group; and $1 \le n \le 3$, $$(R^1{}_3SiO_{1/2})_a(H_nR^2{}_{3-n}SiO_{1/2})_b(SiO_2)_c(R^4SiO_{3/2})_d \quad (6')$$

wherein $R^1$, $R^2$ and "n" represents the same as before; $R^4$ represents an unsubstituted or substituted monovalent hydrocarbon group; and $0 < a \le 1.5$, $0.2 \le b \le 1.5$, $0 < c \le 1.0$, $0 < d \le 1.5$, and $0.5 \le a+b/c \le 1.0$, and $$(R^3O)_3SiR^4 \quad (7)$$

wherein $R^4$ represents the same as before; and $R^3$ may be the same or different with each other, representing an unsubstituted or substituted monovalent hydrocarbon group; wherein
in a $^{29}Si$—NMR analysis of the produced hydrosilyl group-containing organic silicon resin, an integral value of the peak between −10 and −20 ppm is 1.0% or less relative to total integral value of the entire silicon.

15. The method for producing the hydrosilyl group-containing organic silicon resin according to claim 14, wherein the integral value of the peak between −10 and −20 ppm is 0.1% or less relative to the total integral value of the entire silicon.

16. A method for producing a hydrosilyl group-containing organic silicon resin, wherein
after a mixture of one, or two or more of organic silicon compounds represented by following general formulae (1) and (2) with any one or more of a hydrolysable silane represented by following general formula (3), a partial hydrolysis condensate of the hydrolysable silane, and a metal salt of the hydrolysable silane is hydrolyzed in a presence of an acid catalyst,
to a hydrolyzate thereby obtained, one, or two or more of hydrosilyl group-containing organic silicon compounds represented by following general formulae (4) and (5) is added, more than a molar equivalent of the acid catalyst,
which is followed by condensation to obtain a hydrosilyl group-containing organic silicon resin represented by following average composition formula (6'), which contains a Q-unit ($SiO_2$) and an M-unit (($R^1{}_3SiO_{1/2}$) and ($H_nR^2{}_{3-n}SiO_{1/2}$)) as essential components, and which is in a solid form without a solvent;
wherein one, or a mixture of two or more of organic silicon compounds represented by following general formula (7) is further added before hydrolysis of the mixture of one, or two or more of the organic silicon compounds represented by the general formulae (1) and (2) with any one or more of the hydrolysable silane represented by the general formula (3), the partial hydrolysis condensate of the hydrolysable silane, and the metal salt of the hydrolysable silane, or after this hydrolysis and before re-hydrolysis, the hydrosilyl group-containing organic silicon resin, which is a powder form without a solvent is obtained, $$R^1{}_3SiOSiR^1{}_3 \quad (1)$$

$$R^1{}_3SiX^1 \quad (2)$$

wherein $R^1$ may be the same or different with each other, representing an unsubstituted or substituted monovalent hydrocarbon group; and $X^1$ represents a hydrolysable functional group, $$SiX^2_4 \tag{3}$$

wherein $X^2$ represents a hydrolysable functional group, $$H_nR^2_{3-n}SiOSiR^2_{3-n}H_n \tag{4}$$

$$H_nR^2_{3-n}SiX^3 \tag{5}$$

wherein $R^2$ may be the same or different with each other, representing an unsubstituted or substituted monovalent hydrocarbon group; $X^3$ represents a hydrolysable functional group; and $1 \leq n \leq 3$, $$(R^1_3SiO_{1/2})_a(H_nR^2_{3-n}SiO_{1/2})_b(SiO_2)_c(R^4SiO_{3/2})_d \tag{6'}$$

wherein $R^1$, $R^2$ and "n" represents the same as before; $R^4$ represents an unsubstituted or substituted monovalent hydrocarbon group; and $0<a\leq1.5$, $0.2\leq b\leq1.5$, $0<c\leq1.0$, $0<d\leq1.5$, and $0.5\leq a+b/c\leq1.0$, and $$(R^3O)_3SiR^4 \tag{7}$$

wherein $R^4$ represents the same as before; and $R^3$ may be the same or different with each other, representing an unsubstituted or substituted monovalent hydrocarbon group; wherein after the mixture of one, or two or more of the organic silicon compounds represented by the general formulae (1) and (2) with any one or more of the hydrolysable silane represented by the general formula (3), the partial hydrolysis condensate of the hydrolysable silane, and the metal salt of the hydrolysable silane, is hydrolyzed in the presence of the acid catalyst, the hydrolyzate is cooled down to 25° C.; and then, after the hydrosilyl group-containing organic silicon compound is added, re-hydrolysis is carried out at a temperature below a boiling point of the used hydrosilyl group-containing organic silicon compound.

17. A method for producing a hydrosilyl group-containing organic silicon resin, wherein after a mixture of one, or two or more of organic silicon compounds represented by following general formulae (1) and (2) with any one or more of a hydrolysable silane represented by following general formula (3), a partial hydrolysis condensate of the hydrolysable silane, and a metal salt of the hydrolysable silane is hydrolyzed in a presence of an acid catalyst, to a hydrolyzate thereby obtained, one, or two or more of hydrosilyl group-containing organic silicon compounds represented by following general formulae (4) and (5) is added, which is then followed by re-hydrolysis, and thereafter, neutralization is done by adding a base catalyst with an amount of more than a molar equivalent of the acid catalyst, which is followed by condensation to obtain a hydrosilyl group-containing organic silicon resin represented by following average composition formula (6'), which contains a Q-unit ($SiO_2$) and an M-unit (($R^1_3SiO_{1/2}$) and ($H_nR^2_{3-n}SiO_{1/2}$)) as essential components, and which is in a solid form without a solvent;

wherein one, or a mixture of two or more of organic silicon compounds represented by following general formula (7) is further added before hydrolysis of the mixture of one, or two or more of the organic silicon compounds represented by the general formulae (1) and (2) with any one or more of the hydrolysable silane represented by the general formula (3), the partial hydrolysis condensate of the hydrolysable silane, and the metal salt of the hydrolysable silane, or after this hydrolysis and before re-hydrolysis, the hydrosilyl group-containing organic silicon resin, which is a powder form without a solvent is obtained, $$R^1_3SiOSiR^1_3 \tag{1}$$

$$R^1_3SiX^1 \tag{2}$$

wherein $R^1$ may be the same or different with each other, representing an unsubstituted or substituted monovalent hydrocarbon group; and $X^1$ represents a hydrolysable functional group, $$SiX^2_4 \tag{3}$$

wherein $X^2$ represents a hydrolysable functional group, $$H_nR^2_{3-n}SiOSiR^2_{3-n}H_n \tag{4}$$

$$H_nR^2_{3-n}SiX^3 \tag{5}$$

wherein $R^2$ may be the same or different with each other, representing an unsubstituted or substituted monovalent hydrocarbon group; $X^3$ represents a hydrolysable functional group; and $1 \leq n \leq 3$, $$(R^1_3SiO_{1/2})_a(H_nR^2_{3-n}SiO_{1/2})_b(SiO_2)_c(R^4SiO_{3/2})_d \tag{6'}$$

wherein $R^1$, $R^2$ and "n" represents the same as before; $R^4$ represents an unsubstituted or substituted monovalent hydrocarbon group; and $0<a\leq1.5$, $0.2\leq b\leq1.5$, $0<c\leq1.0$, $0<d\leq1.5$, and $0.5\leq a+b/c\leq1.0$, and $$(R^3O)_3SiR^4 \tag{7}$$

wherein $R^4$ represents the same as before; and $R^3$ may be the same or different with each other, representing an unsubstituted or substituted monovalent hydrocarbon group; wherein in neutralization by using the base catalyst, sodium hydroxide as a strong base catalyst and calcium carbonate as a weak base catalyst are concurrently used.

* * * * *